(12) United States Patent
King et al.

(10) Patent No.: US 6,270,177 B1
(45) Date of Patent: Aug. 7, 2001

(54) PRINTER UNIT FOR PC DISK DRIVE BAY

(75) Inventors: Tobin Allen King, Cremorne; Kia Silverbrook, Balmain, both of (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 09/436,533

(22) Filed: Nov. 9, 1999

(30) Foreign Application Priority Data

Nov. 9, 1998 (AU) .................................................. PP 7026

(51) Int. Cl.[7] .......................................................... B41J 3/00
(52) U.S. Cl. ................................................. 347/2; 347/108
(58) Field of Search ................................ 347/2, 3, 49, 5, 347/108; 400/54, 685

(56) References Cited

U.S. PATENT DOCUMENTS 5,020,926 * 6/1991 Wilhelm .................................. 400/54
5,909,227 * 6/1999 Silverbrook .............................. 347/3

FOREIGN PATENT DOCUMENTS

WO 96/39301 * 12/1996 (WO) .............................. B41J/29/38

* cited by examiner

Primary Examiner—Huan Tran
Assistant Examiner—Hai C. Pham (57) ABSTRACT

A printer unit having a pagewidth full color ink jet printhead; a detachable print roll cartridge including ink and paper, wherein the printer unit is formed within the disk drive bay of a personal computer type system. The printer unit includes a rotatable mount enabling the printed paper to be ejected from the front of the disk drive bay in an operational position, and the cartridge to be loaded longitudinally from the front when the printer is rotated through 90° to a loading position.

7 Claims, 9 Drawing Sheets

PRINTER UNIT FOR PC DISK DRIVE BAY

FIELD OF THE INVENTION

The present invention relates to printing systems and in particular discloses a printer unit adapted to be fitted within the disk drive bay of a standard Personal Computer type system.

BACKGROUND OF THE INVENTION

Most standard personal computer type systems, for example, the IBM™ PC, various clones thereof, and equivalent types of computers manufactured by various makers include disk drive bays adapted to receive a variety of different disk type memory devices. Computers of this type are generally referred to throughout this specification as PC devices or PC's.

There are many instances where it is required to use a printer to print out information from a PC and such printers are commonly provided as separate units, connected to the PC by an appropriate cable connection, plugs and sockets. It has, however, been recognized by the inventor that there are many situations where it would be advantageous to incorporate a small and compact printer within the PC itself and that furthermore, it would be desirable to provide such printer in a modular form which would enable the printer to be engaged with the PC disk drive bay of existing PC's.

SUMMARY OF THE INVENTION

In accordance with the present invention, there is provided a printer unit incorporating a printhead, a print controller chip arranged to control the printhead, and ink and paper supply means, said printer unit being configured to fit within a personal computer type disk drive bay.

Preferably the printhead is a pagewidth inkjet printhead.

Preferably the ink and paper supply means are provided within a demountable cartridge.

Preferably the demountable cartridge is elongate in shape and adapted to be inserted into the printer unit in a longitudinal direction.

Preferably the printer unit is rotatably mounted to a sub-frame configured to fit within the disk drive bay so that the printer unit is rotatable between an operational position wherein paper from the paper supply means is adapted to be ejected from the front of the disk drive bay and a loading position wherein the demountable cartridge is adapted to be inserted longitudinally into the printer unit.

Preferably the printer unit is rotated approximately 90° between the operational position and the loading position.

BRIEF DESCRIPTION OF THE DRAWINGS

Notwithstanding any other forms that may fall within its scope, one preferred form of the invention will now be described, by way of example only, with reference to the accompanying drawings, in which.

DESCRIPTION OF PREFERRED AND OTHER EMBODIMENTS

In the preferred embodiment of the invention, a printer unit is provided having an overall size and shape adapted to fit within the disk drive bay of a conventional PC. The printer unit uses a system incorporating a pagewidth inkjet printhead, a print controller chip and a consumable ink and paper supply cartridge of the type filly described in international patent application PCT/AU98/00544 entitled 'A camera with an internal printing system' the contents of which are hereby incorporated into this specification by way of cross reference.

The aforementioned PCT application discloses a camera system having an integral printer which utilizes a print roll containing ink and 'paper' or other print media (referred to throughout this specification as paper) upon which images are printed on demand. In the preferred embodiment of this invention, the image sensing portions of the camera arrangement of international application PCT/AU98/00544 are dispensed with and the print roll and printhead are designed to be incorporated into a printer unit configured to fit within the disk drive bay of a PC.

The printer unit 1 is preferably rotatably mounted to a sub-frame 2 designed for insertion into the disk drive unit of a PC and typically having engagement lugs 3, an eject button 4 and power LED 5. The printer unit has a paper exit slot 6 as can be clearly seen in FIG. 1.

Figure 1:
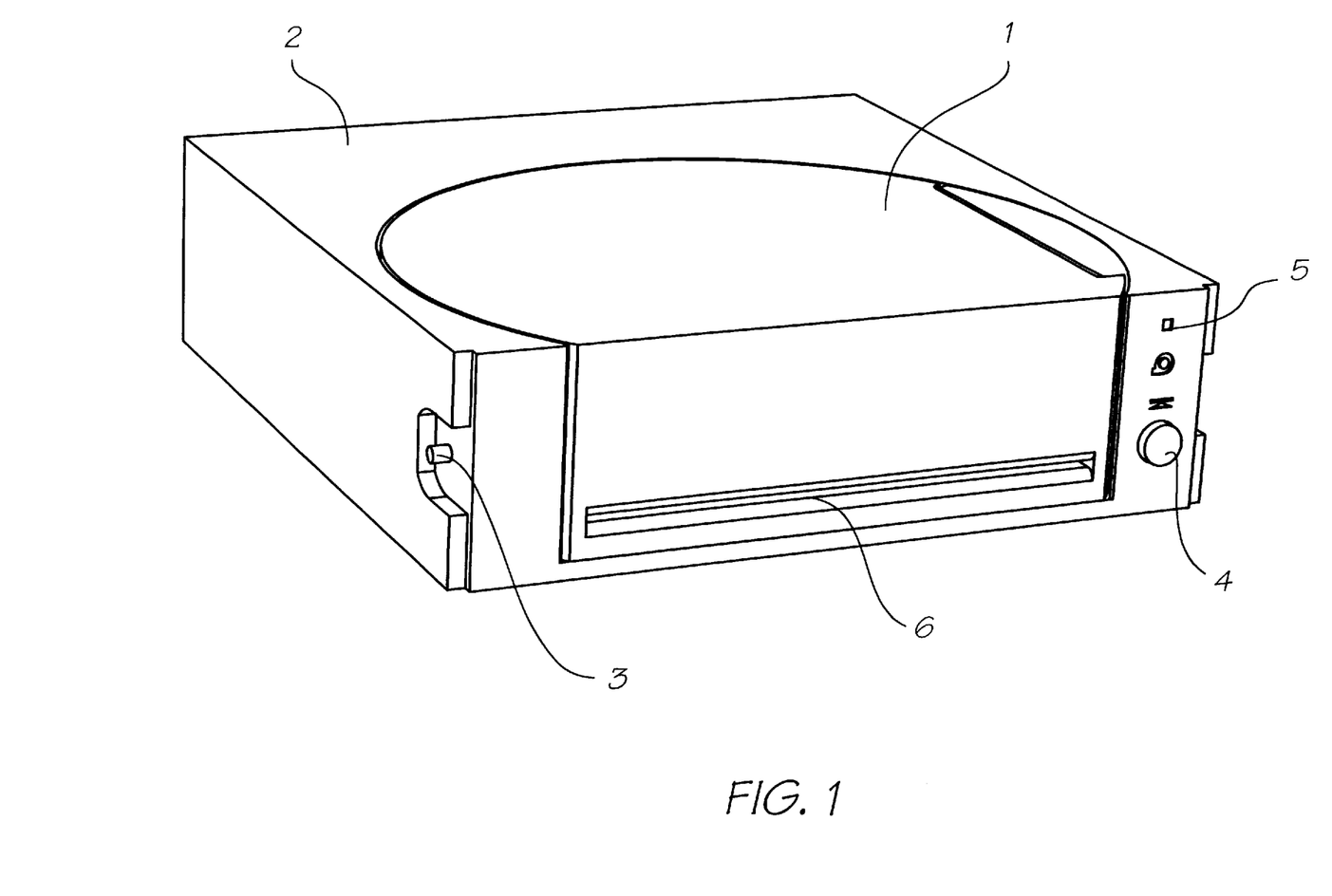
FIG. 1 is a front perspective view of a printer unit according to the invention in the operational position.
Figure 2:
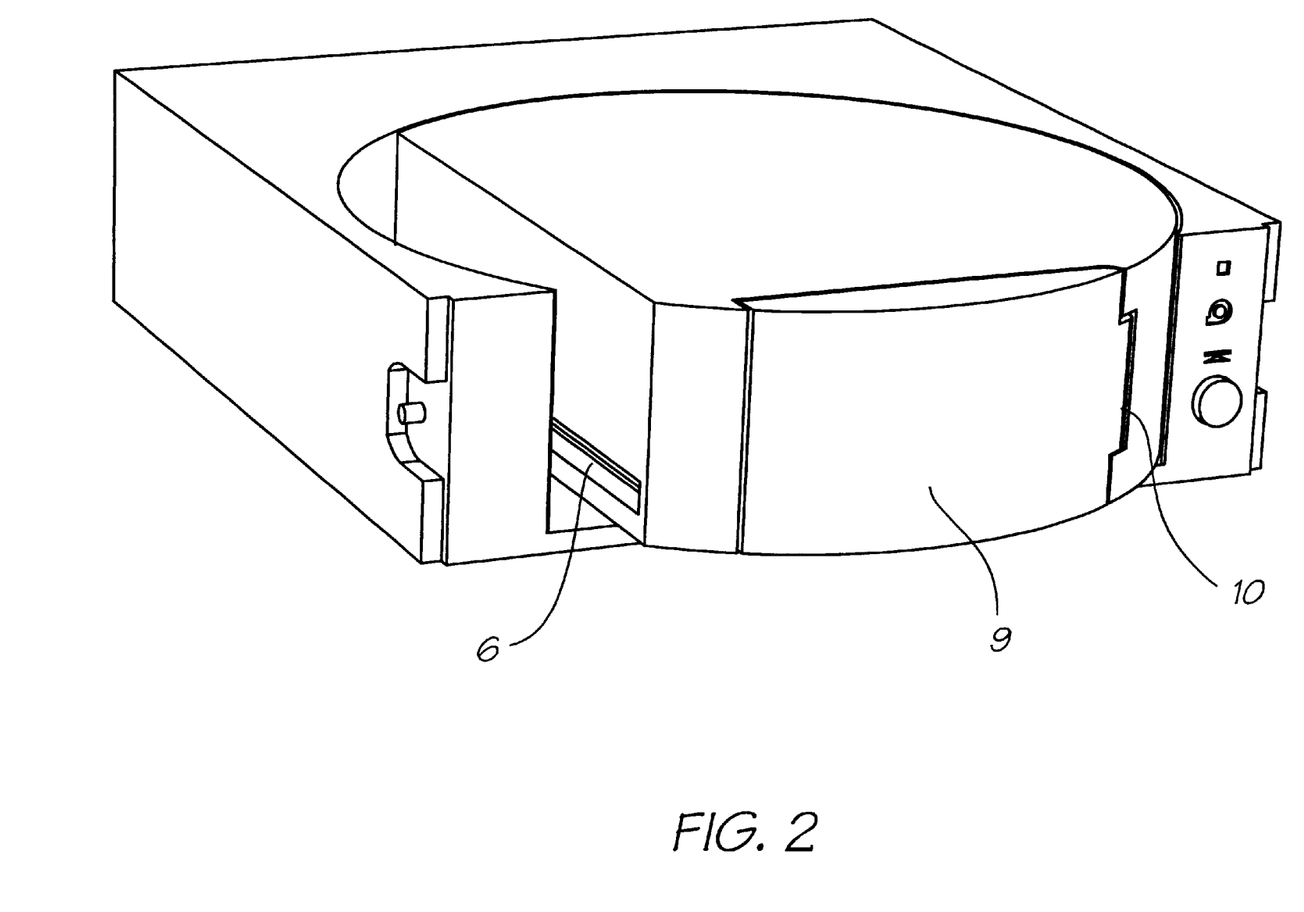
FIG. 2 is a similar view to FIG. 1 in the loading position.

FIG. 2 shows the unit of FIG. 1 with the printer unit rotated through 90° for the insertion of a paper and ink cartridge of the type described in the aforementioned international patent application. The printer unit is typically rotated by way of an electric motor 7 (FIG. 4) operating through a gear train 8 to rotate the printer unit between the operational position shown in FIG. 1 and the loading position shown in FIG. 2. In the loading position, a loading door 9 may be opened outwardly on hinge 10 as shown in FIG. 3 to reveal an opening 11 adapted to receive the ink and paper cartridge 12.

Figure 3:
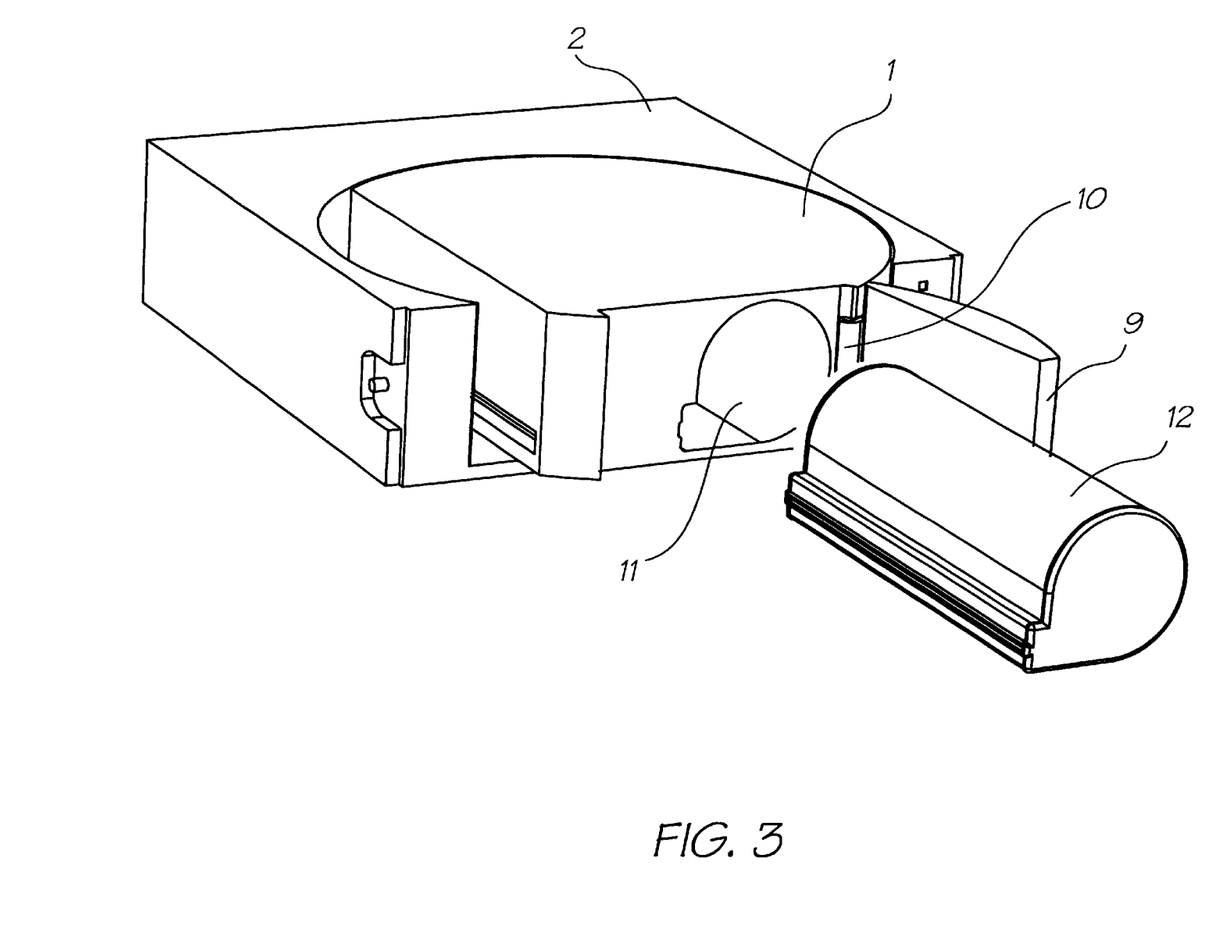
FIG. 3 is a similar view to FIG. 2 showing the loading door open and a demountable cartridge aligned for loading.

The ink and paper cartridge 12 is elongate in shape and adapted to be inserted into the printer unit in a longitudinal direction as will be apparent from FIG. 3.

Figure 4:
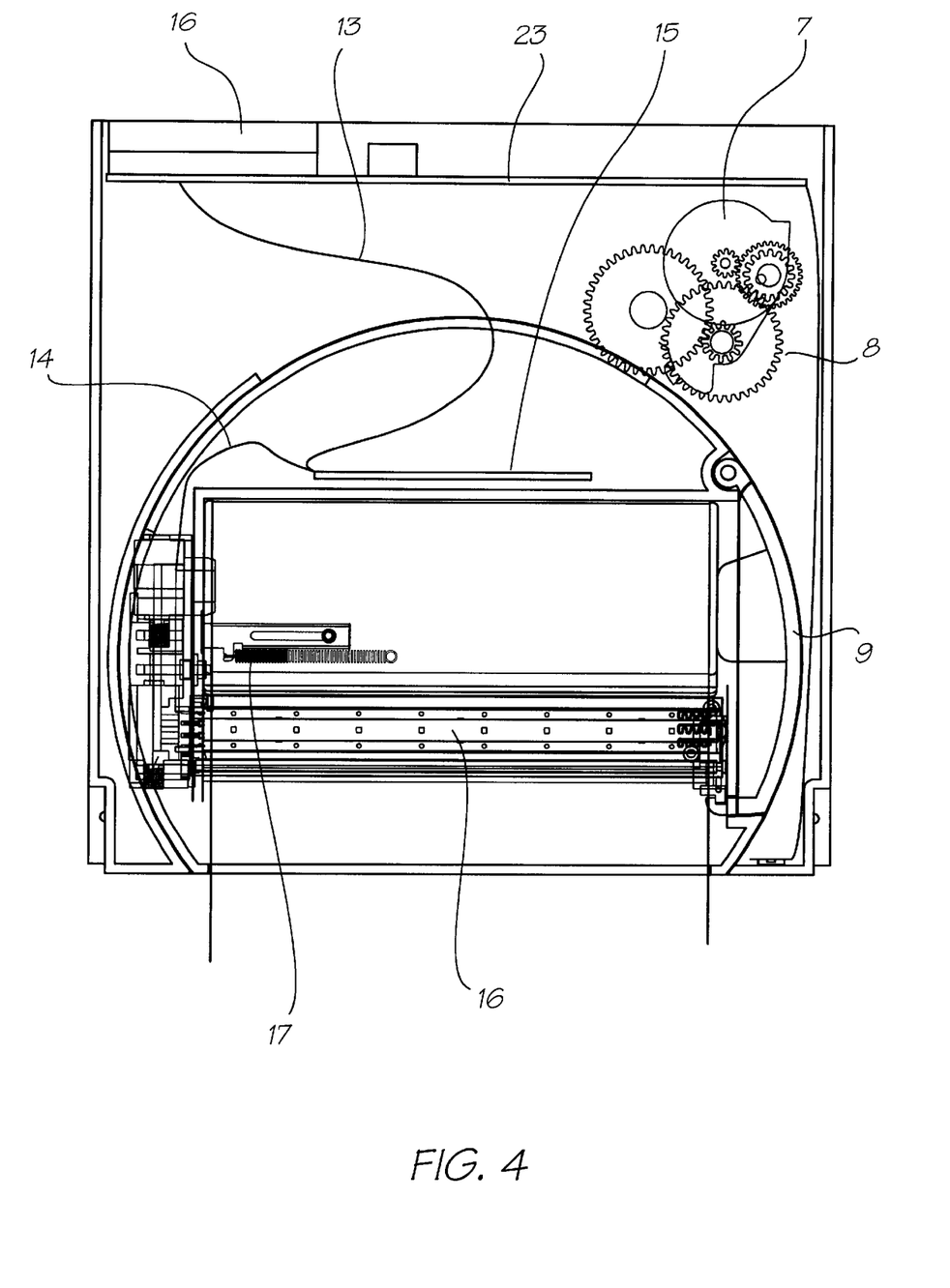
FIG. 4 is a horizontal section through the printer in the position shown in FIG. 1.
Figure 5:
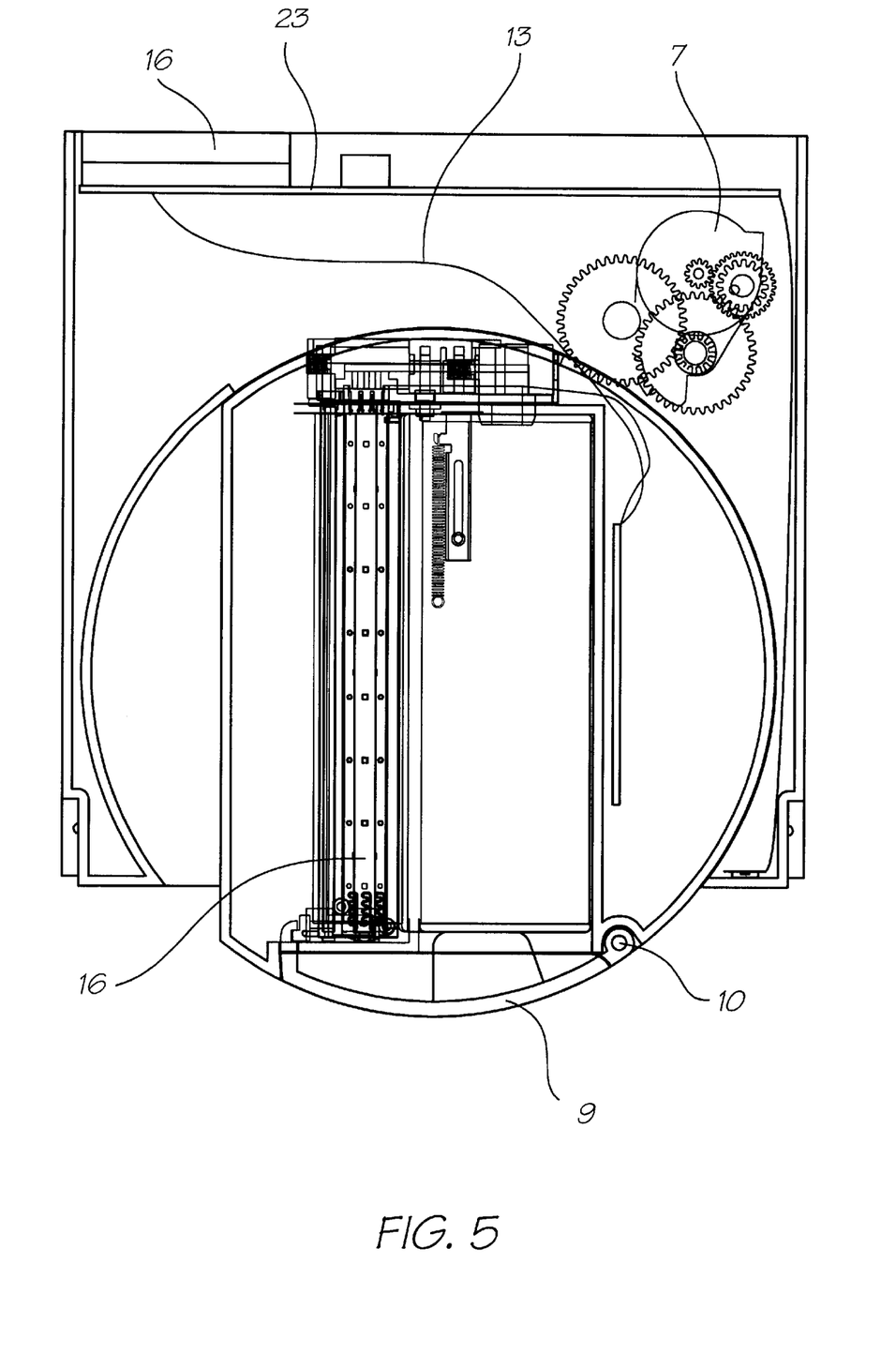
FIG. 5 is a similar view to FIG. 4 with the printer in the position shown in FIG. 2.
Figure 6:
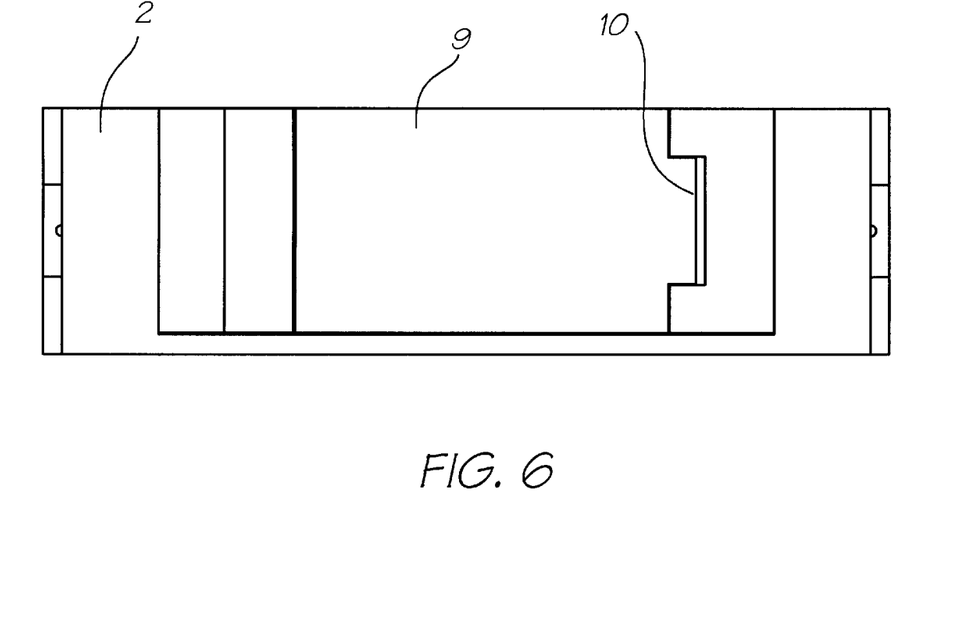
FIG. 6 is a front view of the printer in the position shown in FIG. 2.

FIG. 4 shows some of the internal arrangement of the printer unit including flexible PCB's 13 and 14 which connect the electronic circuitry from a further PCB 15 to a standard connector 16 engageable with a standard interface in the PC disk drive bay, and the printhead respectively.

The printhead is preferably a pagewidth inkjet printhead as shown at 16 in FIG. 4 provided with ink from the ink and paper cartridge as set out in international application PCT/AU98/00544. Also visible in FIG. 4 is the print roll ejector 17.

Figure 7:
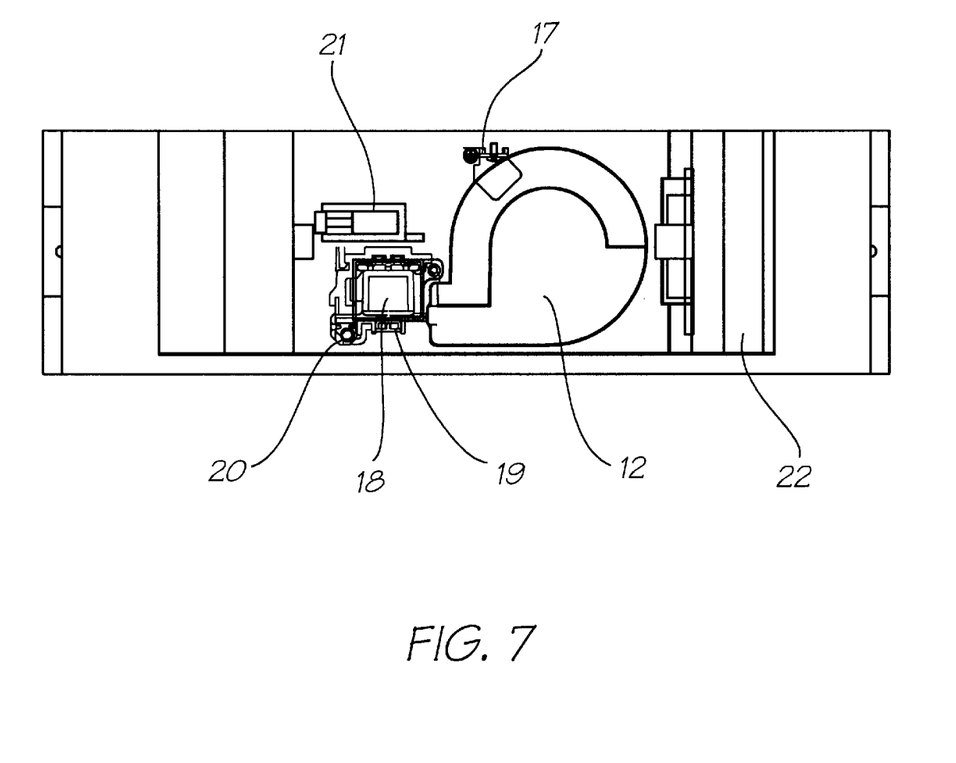
FIG. 7 is a similar view to FIG. 6 with the loading door open.

A cross section through the pagewidth printhead can be seen in FIG. 7 which clearly shows the print chamber 18, the capping mechanism 19 of the printhead, and the paper cutter 20. Also clearly visible in FIG. 7 is the print roll door solenoid 21 operable to open and close the print roll door 22.

Figure 8:
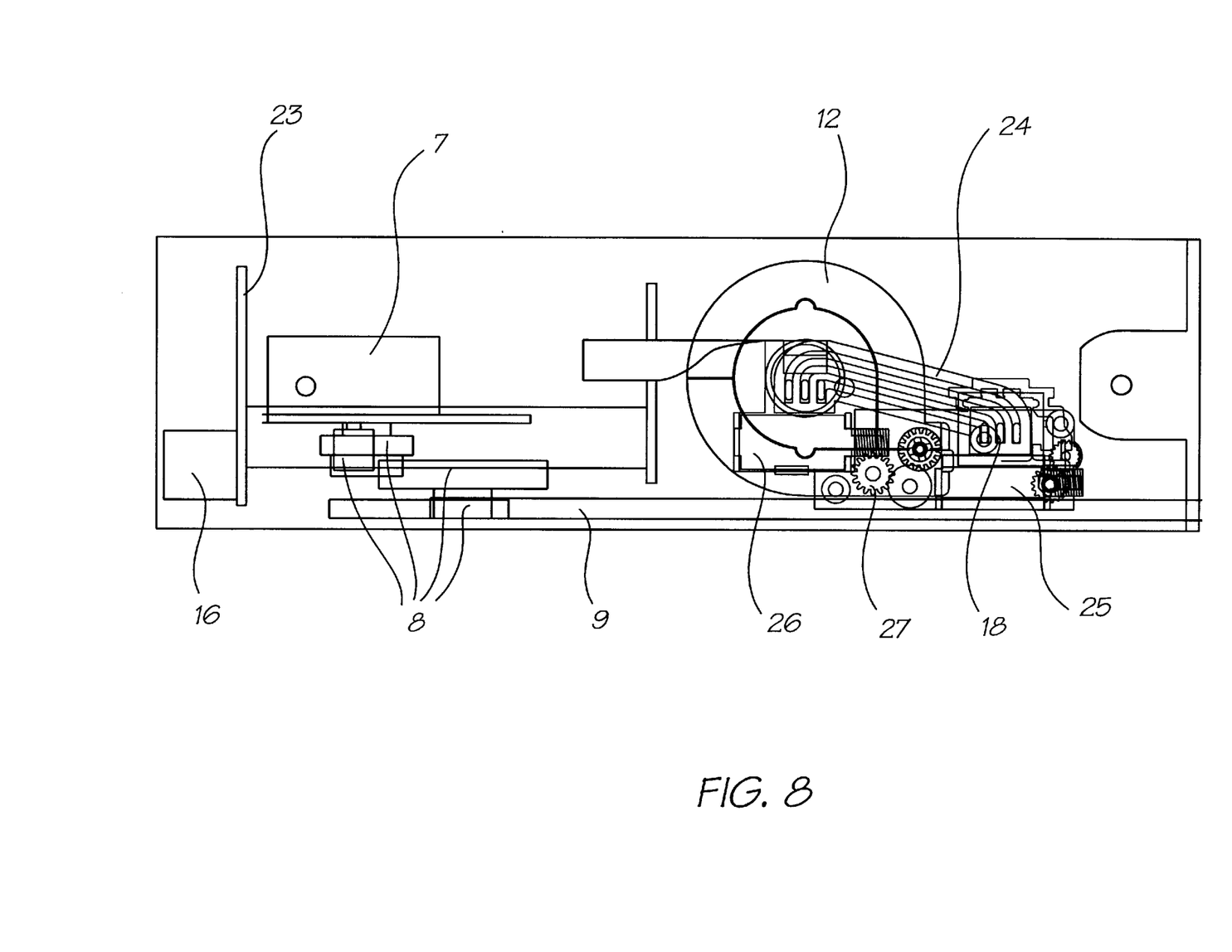
FIG. 8 is a vertical section to an enlarged scale through the printer unit.
Figure 9:
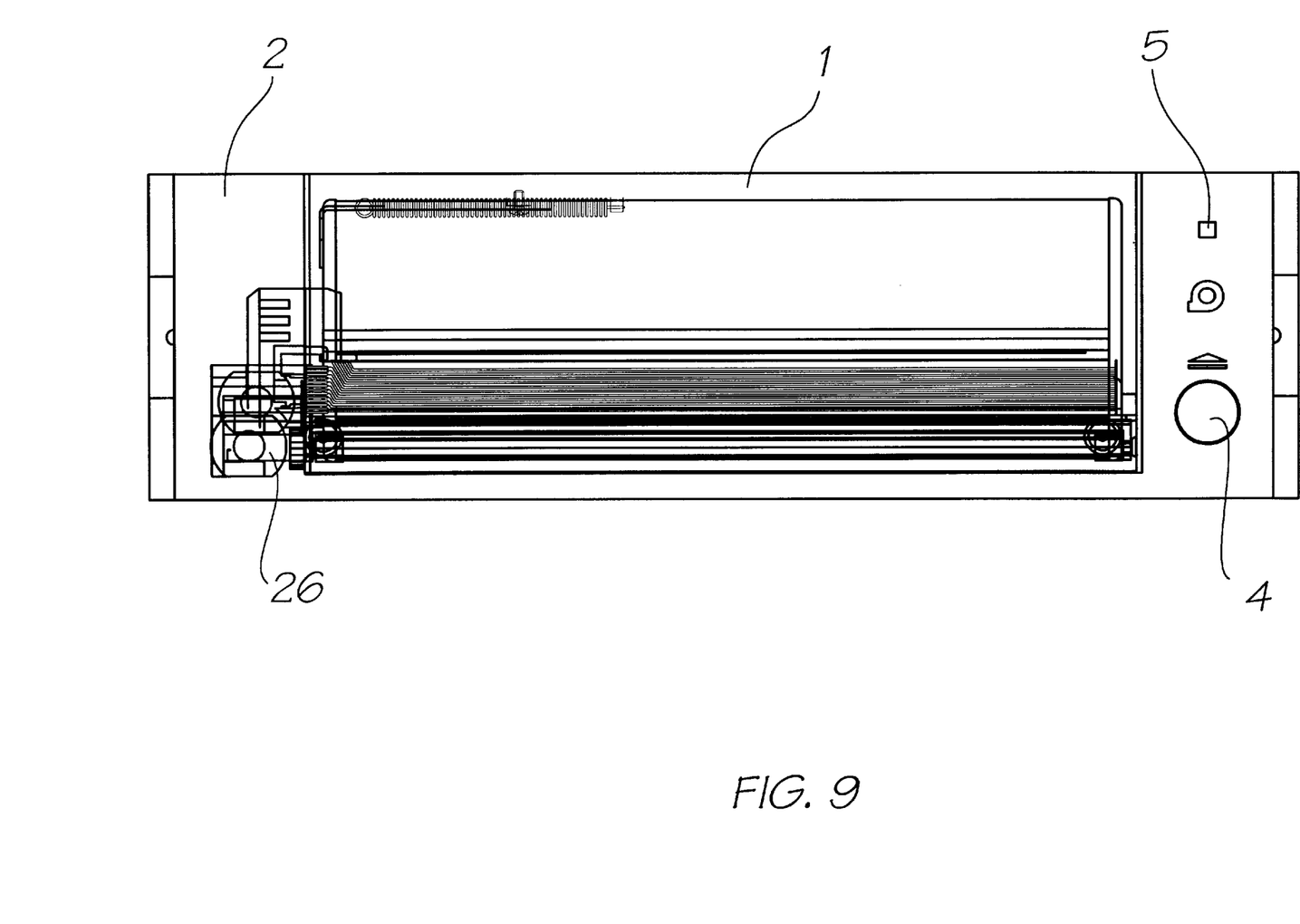
FIG. 9 is a vertical section at right angles to FIG. 8.

The vertical cross section in FIG. 8 clearly shows the print roll bay connector 16, the main printer circuit board 23, the rotatable drum drive motor 7, gears 8 and drum base 9. FIG. 8 also shows the ink channels 24 extending between the print roll 12 and the print chamber 18. The paper cutter 20 is driven by a motor drive 25.

Also visible in FIG. 8 is the print roll motor 26 and gear train 27 arranged to drive the print roll in the same manner as previously described in international application PCT/AU98/00544.

Figure 10:
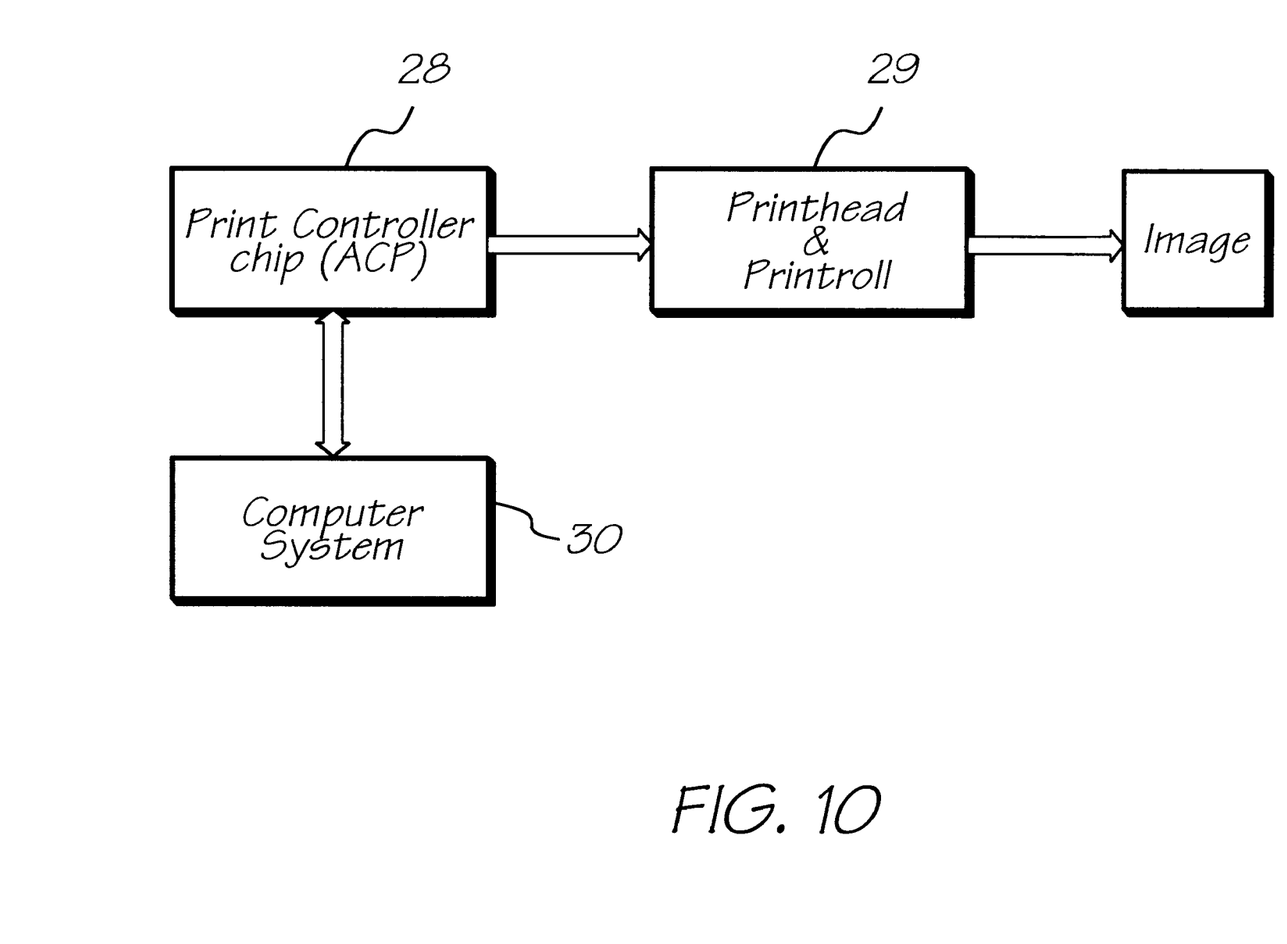
FIG. 10 is a block diagram illustrating the operation of the printer unit.

Turning now to FIG. 10 there is illustrated the schematic operation of the preferred embodiment of the invention. Preferably, the computer system sends print data to the print controller chip 28 which can be a modified form of the ACP chip as discussed in the aforementioned PCT application. The ACP chip is responsible for operational control of the printhead and print roll to print out images on demand and to authenticate the print roll 29 which as discussed in the aforementioned application, can have an on board authentication system.

In this manner a printer unit is provided, able to print images of photographic size (typically 6 inches by 4 inches) from a compact and simple to arrange printer unit adapted to be wholly contained within the disk drive bay of a PC.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A printer unit which comprises:

a printing mechanism having a printhead, a print controller chip which is operatively arranged with respect to the printhead to control the printhead, a loading arrangement which is configured to permit the loading of a printing cartridge into the printing mechanism, the printing mechanism being dimensioned to fit within a disk drive bay of a personal computer; and a subframe which is also dimensioned to fit within the disk drive bay, the printing mechanism being rotatably mounted on the subframe to be displaceable between an operational position in which paper is ejected from a front of the disk drive bay and a position in which the loading arrangement is accessible to allow for the loading of a printing cartridge.

2. A printer unit as claimed in claim 1, wherein the printhead is an inkjet printhead.

3. A printer unit as claimed in claim 2, wherein the printhead is a pagewidth printhead.

4. A printer unit as claimed in claim 1, wherein the loading arrangement is configured to permit an ink and paper supply means provided within the printing cartridge to be loaded into the printing mechanism.

5. A printer unit as claimed in claim 4, wherein the loading arrangement is configured to permit an elongate demountable cartridge to be inserted into the printer unit in a lengthwise direction.

6. A printer unit as claimed in claim 1, wherein the printing mechanism is rotatable through approximately 90° between the operational position and the loading position.

7. A printer unit which comprises:

a printing mechanism having a printhead, a print controller chip which is operatively arranged with respect to the printhead to control the printhead, the printing mechanism being dimensioned to fit within a disk drive bay of a personal computer and having an ink and paper supply means; and a subframe which is also dimensioned to fit within the disk drive bay, the printing mechanism being rotatably mounted on the subframe to be displaceable between an operational position in which paper is ejected from a front of the disk drive bay and a position in which a loading arrangement is accessible to allow for the re-supply of paper and ink to the paper supply means.

* * * * *